United States Patent
Junk et al.

(10) Patent No.: US 10,041,610 B2
(45) Date of Patent: Aug. 7, 2018

(54) METHODS AND APPARATUS OF STABILIZING A VALVE POSITIONER WHEN TESTING A SOLENOID VALVE

(71) Applicant: Fisher Controls International LLC, Marshalltown, IA (US)

(72) Inventors: Kenneth Junk, Marshalltown, IA (US); Shannon Jelken, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 120 days.

(21) Appl. No.: 15/298,717

(22) Filed: Oct. 20, 2016

(65) Prior Publication Data

US 2018/0112796 A1    Apr. 26, 2018

(51) Int. Cl.
*F16K 31/124* (2006.01)
*F16K 37/00* (2006.01)
*F16K 31/06* (2006.01)

(52) U.S. Cl.
CPC .......... *F16K 37/0091* (2013.01); *F16K 31/06* (2013.01)

(58) Field of Classification Search
CPC .. F16K 31/06; F16K 37/0091; F16K 37/0075; F15B 19/005; F15B 19/002; F15B 19/00
See application file for complete search history.

(56) References Cited

U.S. PATENT DOCUMENTS

| | | | | |
|---|---|---|---|---|
| 5,558,115 A | * | 9/1996 | Lenz | G05D 7/005 137/486 |
| 5,573,032 A | * | 11/1996 | Lenz | G05D 7/005 137/486 |
| 6,920,409 B2 | * | 7/2005 | Essam | F15B 19/005 702/113 |

(Continued)

FOREIGN PATENT DOCUMENTS

WO    2014197422    12/2014

OTHER PUBLICATIONS

Emerson Process Management, "Fisher FIELDVUE™ DVC6200 Digital Valve Controller—Instruction Manual D103409X012," Fisher Controls International LLC, Dec. 2013, 148 pages.

(Continued)

*Primary Examiner* — Freddie Kirkland, III
(74) *Attorney, Agent, or Firm* — Hanley, Flight & Zimmerman, LLC

(57) ABSTRACT

Methods and apparatus of stabilizing a valve positioner when testing a solenoid valve are disclosed. An example apparatus includes a solenoid valve and a valve positioner fluidly and communicatively coupled to the solenoid valve. The valve positioner is to be set in a pressure control state prior to conducting a test of the solenoid valve. The valve positioner is to detect a pressure change across the solenoid valve caused by the solenoid valve transitioning from a first state to a second state and transition the valve positioner from the pressure control state to a saturated state upon detecting the pressure change. The full supply pressure is to stabilize the valve positioner to conduct the test of the solenoid valve. The valve positioner is to maintain the saturated state until the pressure across the solenoid valve returns to the predetermined initial value.

20 Claims, 10 Drawing Sheets

(56) References Cited

U.S. PATENT DOCUMENTS

| | | | | |
|---|---|---|---|---|
| 6,954,683 | B2* | 10/2005 | Junk | F15B 13/0402 |
| | | | | 700/272 |
| 7,464,721 | B2* | 12/2008 | Perry | G05B 23/0256 |
| | | | | 137/12 |
| 7,609,056 | B2* | 10/2009 | Junk | F16K 37/0033 |
| | | | | 137/553 |
| 7,621,293 | B2 | 11/2009 | Snowbarger | |
| 8,104,495 | B2 | 1/2012 | Snowbarger | |
| 8,540,211 | B2* | 9/2013 | Wheater | F16K 37/0091 |
| | | | | 251/129.04 |
| 8,684,021 | B2 | 4/2014 | Snowbarger | |
| 8,725,434 | B2* | 5/2014 | Flanders | E21B 34/02 |
| | | | | 137/487.5 |
| 8,996,328 | B2 | 3/2015 | Snowbarger | |
| 9,551,434 | B1* | 1/2017 | Hung | F16K 37/0083 |
| 9,611,873 | B2* | 4/2017 | Junk | F15B 19/005 |
| 9,752,599 | B2* | 9/2017 | Junk | F15B 19/005 |
| 2011/0114191 | A1* | 5/2011 | Wheater | F16K 37/0091 |
| | | | | 137/12 |
| 2015/0323936 | A1 | 11/2015 | Junk | |
| 2016/0098044 | A1 | 4/2016 | Junk et al. | |
| 2016/0273676 | A1 | 9/2016 | Junk | |
| 2016/0274598 | A1 | 9/2016 | Junk | |

OTHER PUBLICATIONS

NORGREN, "Emergency Shut-Down Solutions—Process Safety, Reliability, & Efficiency," IMI Norgren Co., Ltd. 2008, 4 pages.

IMI Precision Engineering,"ICO4-PST Solenoid Valve—The Smart Solenoid for Integrated Partial Stroke Testing," Norgren Limited, 2015, 8 pages.

IMI Precision Engineering,"ICO4-PST Frequently Asked Questions" Version 2, Jul. 2015, 6 pages.

International Searching Authority, "International Search Report and Written Opinion," issued in connection with International Patent Application No. PCT/US2017/055124, dated Feb. 8, 2018, 12 pages.

* cited by examiner

METHODS AND APPARATUS OF STABILIZING A VALVE POSITIONER WHEN TESTING A SOLENOID VALVE

CROSS-REFERENCE TO RELATED APPLICATIONS

This patent relates to subject matter disclosed in a U.S. patent application entitled "Methods and Apparatus of Testing a Solenoid Valve of an Emergency Valve via a Positioner" U.S. application Ser. No. 15/298,731 and a U.S. patent application entitled "Methods and Apparatus of Assessing a Test of a Solenoid Valve via a Positioner" Ser. No. 15/298,726, both of which were filed on Oct. 20, 2016 and are incorporated herein by reference in their entireties.

FIELD OF THE DISCLOSURE

This patent relates generally to solenoid valves and, more particularly, to methods and apparatus of stabilizing a valve positioner when testing a solenoid valve.

BACKGROUND

Emergency valves (e.g., shutdown valves, vent valves) oftentimes are used in environments (e.g., within the oil and gas industry) to protect people, equipment and/or the environment in dangerous conditions. For example, an emergency shutdown valve may be actuated (e.g., closed) to stop flow of hazardous material upon detection of a dangerous condition. In some instances, tests are conducted on the emergency valves to verify that the emergency shutdown valves are capable of actuating.

SUMMARY

In one example, an apparatus includes a solenoid valve that is to enable an actuator to close an emergency valve and a valve positioner fluidly and communicatively coupled to the solenoid valve. The valve positioner is to be set in a pressure control state to maintain upstream pressure of the solenoid valve at a predetermined initial value prior to conducting a test of the solenoid valve. The valve positioner is to detect a pressure change across the solenoid valve caused by the solenoid valve transitioning from a first state to a second state and transition the valve positioner from the pressure control state to a saturated state upon detecting the pressure change during which the valve positioner provides a full supply pressure. The full supply pressure is to stabilize the valve positioner upon the solenoid valve transitioning from the first state to the second state to conduct the test of the solenoid valve. The valve positioner is to maintain the saturated state until the pressure across the solenoid valve returns to the predetermined initial value.

In another example, a method includes setting, by executing first instructions via a processor, a valve positioner in a pressure control state to maintain upstream pressure of a solenoid valve of an emergency system at a predetermined initial value prior to conducting a test of the solenoid valve. The method includes detecting, by executing second instructions via the processor, a pressure change across the solenoid valve caused by the solenoid valve transitioning from a first state to a second state. The method includes, upon detecting the pressure change, transitioning, by executing third instructions via the processor, the valve positioner from the pressure control state to a saturated state during which the valve positioner provides a full supply pressure to stabilize the valve positioner upon the solenoid valve transitioning from the first state to the second state to conduct the test of the solenoid valve. The method includes maintaining, by executing fourth instructions via the processor, the valve positioner in the saturated state until the pressure across the solenoid valve returns to the predetermined initial value.

In another example, an apparatus includes means for actuating an actuator to close an emergency valve and means for positioning fluidly and communicatively coupled to the means for actuating. The means for positioning is to be set in a pressure control state to maintain upstream pressure of the means for actuating at a predetermined initial value prior to conducting a test of the means for actuating. The means for positioning includes means for detecting a pressure change across the means for actuating caused by the means for actuating transitioning from a first state to a second state. The means for positioning includes means for transitioning the means for positioning from the pressure control state to a saturated state upon detecting the pressure change during which the means for positioning provides a full supply pressure. The full supply pressure is to stabilize the means for positioning upon the means for actuating transitioning from the first state to the second state to conduct the test of the means for actuating. The means for transitioning is to maintain the saturated state until the pressure across the means for actuating returns to the predetermined initial value.

Figure 1:
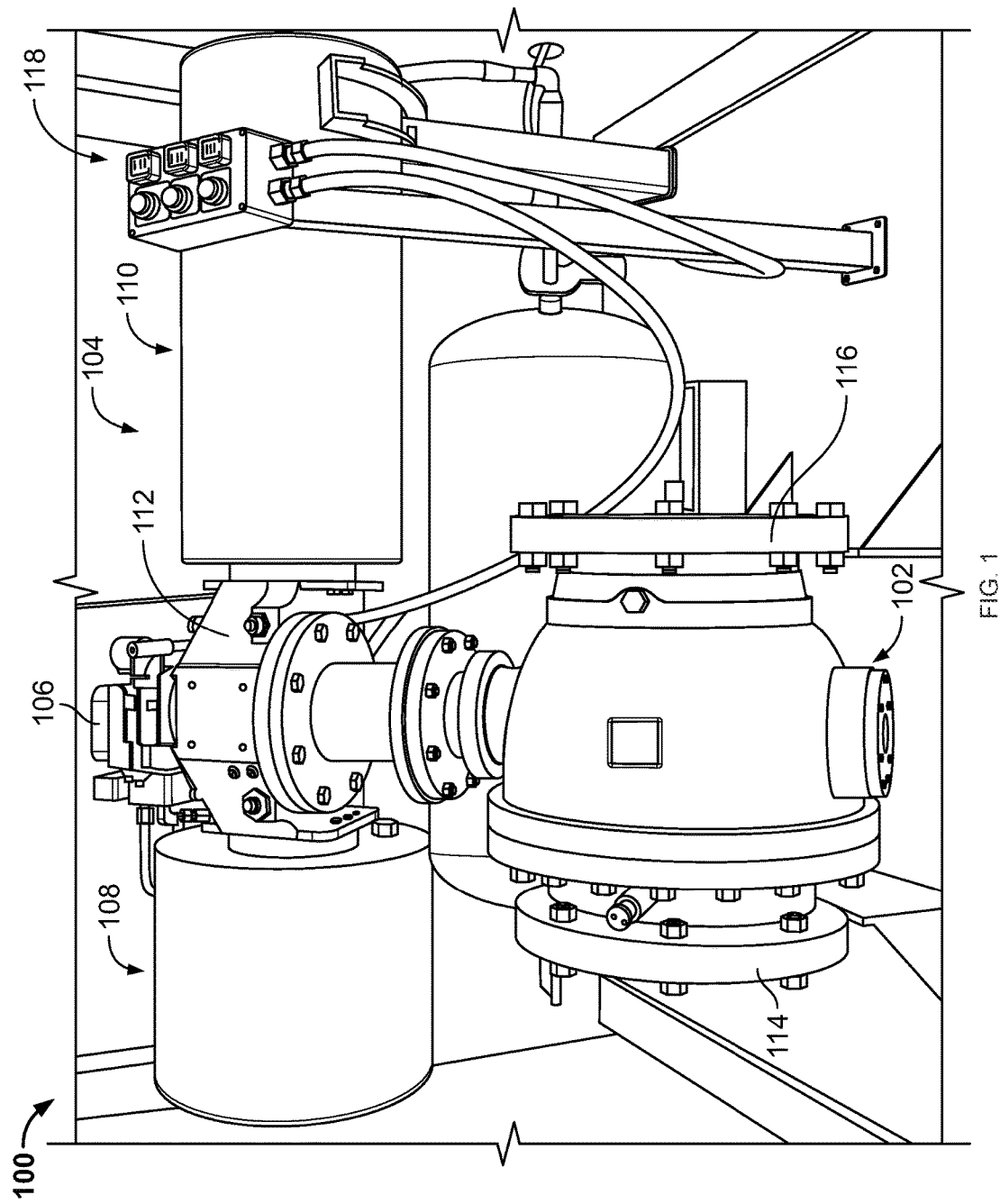
FIG. 1 illustrates an example shutdown valve, an example actuator, and an example valve positioner in accordance with the teachings of this disclosure.

The figures are not to scale. Instead, to clarify multiple layers and regions, the thicknesses of the layers may be}

DETAILED DESCRIPTION

Emergency valves (e.g., shutdown valves, vent valves) are utilized in environments, such as within the oil and gas industry, to protect people, equipment and/or the environment in dangerous conditions. For example, a shutdown valve may be closed upon detection of dangerous condition(s) to stop flow of hazardous material and, thus, reduce risk of harm to the people, equipment and/or environment.

For example, some known shutdown valves are actuated (e.g., closed, opened) via an actuator that is operatively coupled to a solenoid valve in communication with a controller (e.g., a programmable controller, a programmable logic controller, a logic solver, etc.). In some instances, the actuator includes a piston that is disposed in a chamber and operatively coupled to a spring. When pressure within the chamber applies a force to the piston that is greater than a preset load of the spring, the piston prevents the spring and, thus, the actuator from actuating, thereby retaining the shutdown valve in an open position. When the pressure within the chamber falls below the preset load of the spring, the spring causes the piston within the chamber to actuate and, thus, causes the actuator to actuate the shutdown valve from the open position to a closed position. In some instances, the position of the actuator is controlled by the solenoid valve that provides air to and/or removes (e.g., exhausts, vents) air from the chamber. For example, the solenoid valve vents air from the actuator upon receiving an emergency signal from the controller that is in communication with a sensor detecting the existence of the dangerous and/or hazardous condition(s).

In some instances, an environment may not have dangerous and/or hazardous condition(s) for extended periods of time. As a result, the emergency valve, the actuator and/or the solenoid valve may not actuate for an extended period of time. In such instances, the emergency valve, the actuator and/or the solenoid valve may deteriorate and/or become damaged in a manner that causes the emergency valve to fail to actuate (e.g., close for a shutdown valve, open for a vent valve) upon detection of a dangerous and/or hazardous condition. To verify that the emergency valve will actuate upon detection of such conditions, some emergency valves are tested periodically.

Some known emergency valves are tested via a partial stroke test. To conduct a partial stroke test, a positioner is operatively coupled to the actuator so that the position of the actuator and, thus, the emergency valve is controlled by the positioner (not the solenoid valve) during the test. For example, during a partial stroke test of a shutdown valve, the positioner causes the actuator to partially actuate the shutdown valve (e.g., travel a fraction of a full stroke to the closed position such as about between 10% and 15%) from the open position. Because the partial stroke test partially closes the shutdown valve, the partial stroke test interrupts and/or disturbs operation of a system in which the shutdown valve is installed while the partial stroke test is being conducted. As a result, emergency valves oftentimes may be tested via a partial stroke test only once every couple of years. Further, because the actuator and the emergency valve are controlled directly by the positioner during a partial stroke test, such tests fail to verify that the solenoid valve has not deteriorated and/or otherwise become damaged over time in such a manner that would prevent the emergency valve from actuating when a hazardous and/or dangerous condition is detected.

Other known emergency valves are tested by tripping the solenoid valve (e.g., by de-energizing the solenoid valve) to cause the emergency valve to partially close (e.g., to a predetermined partially open position). However, such tests may be difficult to control because the solenoid valve has only two control states (e.g., energized and de-energized) that prohibit precise control of the actuator and, thus, precise control of the emergency valve as air is being vented from the actuator. Further, because the difference between the pressure in the chamber at a rest position and the pressure in the chamber at a fully actuated position is minimal (e.g., due to a large preset load and a low spring rate of the spring), it is oftentimes difficult to correlate the pressure in the chamber and the position of the valve positioner and, thus, to determine how much air must be vented from the chamber before the actuator starts to actuate the emergency valve. Additionally, communicative, electrical and/or mechanical delays in the system may make it difficult to determine how long the solenoid valve should actuate the actuator to partially close and/or partially open the emergency valve and/or return the emergency valve to its rest position. As a result of the difficulty in controlling such tests, the emergency valve oftentimes does not actuate, thereby resulting in a false negative (e.g., as a result of the solenoid valve being tripped for too short of a duration of time). In other instances, such tests result in the shutdown valve actuating more than a desired amount (e.g., over-travel such as fully closing a shutdown valve that results from the solenoid valve being tripped for too long of a duration of time), thereby further interrupting and/or disturbing the system in which the emergency valve is implemented. Moreover, such tests may not detect a damaged solenoid valve in a timely manner, because solenoid valves oftentimes deteriorate more frequently than the rate at which emergency valves are typically tested via tripping the solenoid valve (e.g., emergency valves may be tested once every couple of years).

The examples disclosed herein enable a solenoid valve that controls actuation of an emergency valve (e.g., a shutdown valve, a vent valve) to be tested via a positioner and independently of testing the emergency valve. The examples disclosed herein test the solenoid valve without actuating the emergency valve and, thus, without interrupting and/or disturbing a system in which the emergency valve is installed. To enable the valve positioner to determine a functionality of the solenoid valve, the example methods and apparatus disclosed herein stabilize the valve positioner as the solenoid valve transitions between a first state and a second state during testing of the solenoid valve.

Examples disclosed herein include a solenoid valve that is to enable an actuator to close an emergency valve and a valve positioner that is fluidly and communicatively coupled to the solenoid valve. The valve positioner is initially set in a pressure control state to maintain upstream pressure of the solenoid valve at a predetermined initial value prior to conducting a test of the solenoid valve. Further, the valve positioner detects a pressure change across the solenoid valve that results from the solenoid valve transitioning from a first state to a second state and transitions from the pressure control state to a saturated state upon detecting the pressure change. The valve positioner provides a full supply pressure in the saturated state to stabilize the valve positioner upon the solenoid valve transitioning from the first state to the second state to conduct the test of the solenoid valve. The valve positioner maintains the saturated state until the pressure across the solenoid valve returns to the initial value.

In some examples, the valve positioner is set to the pressure control state via end-point pressure control that suspends full supply pressure (e.g., saturation) of the valve positioner to control the upstream pressure of the solenoid valve. Further, the example valve positioner returns to the pressure control state upon determining that the pressure across the solenoid valve has returned to the initial value. For example, the valve positioner returns to the pressure control state to reduce overshoot of the initial value upon reaching the initial value.

In some examples, the valve positioner receives a fluctuating supply pressure and maintains the upstream pressure of the solenoid valve to be less than an average supply pressure by a predetermined amount (e.g., by about 5 pounds per square inch). The valve positioner maintains the initial value of the upstream pressure to produce consistent pressure characteristics (e.g., the initial pressure value) during the test of the solenoid valve. For example, the valve positioner utilizes the initial pressure value to determine functionality of the solenoid valve.

In some examples, the valve positioner transitions to the saturated state upon detecting the pressure change to prevent a communicative, electrical and/or mechanical delay in transitioning the solenoid valve between the first and second states from affecting the test of the solenoid valve. The valve positioner may transition to the saturated state by bypassing a pressure controller of the valve positioner to prevent the pressure controller from affecting the upstream pressure of the valve positioner. Additionally or alternatively, the valve positioner is maintained in the saturated state after the solenoid valve returns to the first state to increase a reset rate at which the pressure across the solenoid valve returns to the initial value. Further, the valve positioner may be maintained in the saturated state during critical flow and subcritical flow of the solenoid valve.

Turning to the figures, FIG. 1 illustrates an example emergency system 100 as disclosed herein. In the illustrated example, the emergency system 100 includes a shutdown valve 102, an actuator 104, a solenoid valve (e.g., a solenoid valve 202 of FIG. 2), and a valve positioner 106 (e.g., a digital valve controller). The actuator 104 includes a first chamber 108, a second chamber 110, and a drive module housing 112. The first chamber 108 houses a piston (e.g., a piston 510 of FIG. 5) and the second chamber 110 houses a spring (e.g., a spring 514 of FIG. 5) that actuates a shaft (e.g., a shaft 502 of FIG. 5) of the actuator 104 disposed in the drive module housing 112. As illustrated in FIG. 1, the shutdown valve 102 is coupled to the drive module housing 112 of the actuator 104. The shutdown valve 102 includes a valve member (e.g., a ball) that transitions the shutdown valve 102 between an open position and a closed position to control an amount of fluid flowing between a first end 114 and a second end 116 of the shutdown valve 102. The shaft of the actuator 104 is operatively coupled to the valve member of the shutdown valve 102 to enable the actuator 104 to transition the shutdown valve 102 between the open position and the closed position.

In operation, upon detection of a hazardous and/or dangerous environment or condition, the actuator 104 causes the shutdown valve 102 to transition to the closed position. For example, the shutdown valve 102 closes to prevent the fluid (e.g., potentially hazardous material) from flowing when a dangerous condition is detected to increase and/or improve safety of people, equipment and/or the environment. Because hazardous and/or dangerous conditions may not be detected for extended periods of time, the valve positioner 106 of the example emergency system 100 periodically tests the functionality of the shutdown valve 102 and/or the actuator 104 (e.g., via a partial stroke test) to verify that the shutdown valve 102 is capable of closing. For example, the valve positioner 106 periodically conducts a partial stroke test to determine whether the actuator 104 and/or the shutdown valve 102 is damaged and/or otherwise fails to function. Further, in the illustrated example, the emergency system 100 includes a control panel 118 that enables an operator to initiate the valve positioner 106 to test the shutdown valve 102, the actuator 104 and/or the solenoid of the emergency system 100. While the emergency system 100 of the illustrated example includes the shutdown valve 102, the emergency system 100 may alternatively include another type of emergency valve such as a vent valve and/or any other type of valve capable of being actuated via the actuator 104.

Figure 2:
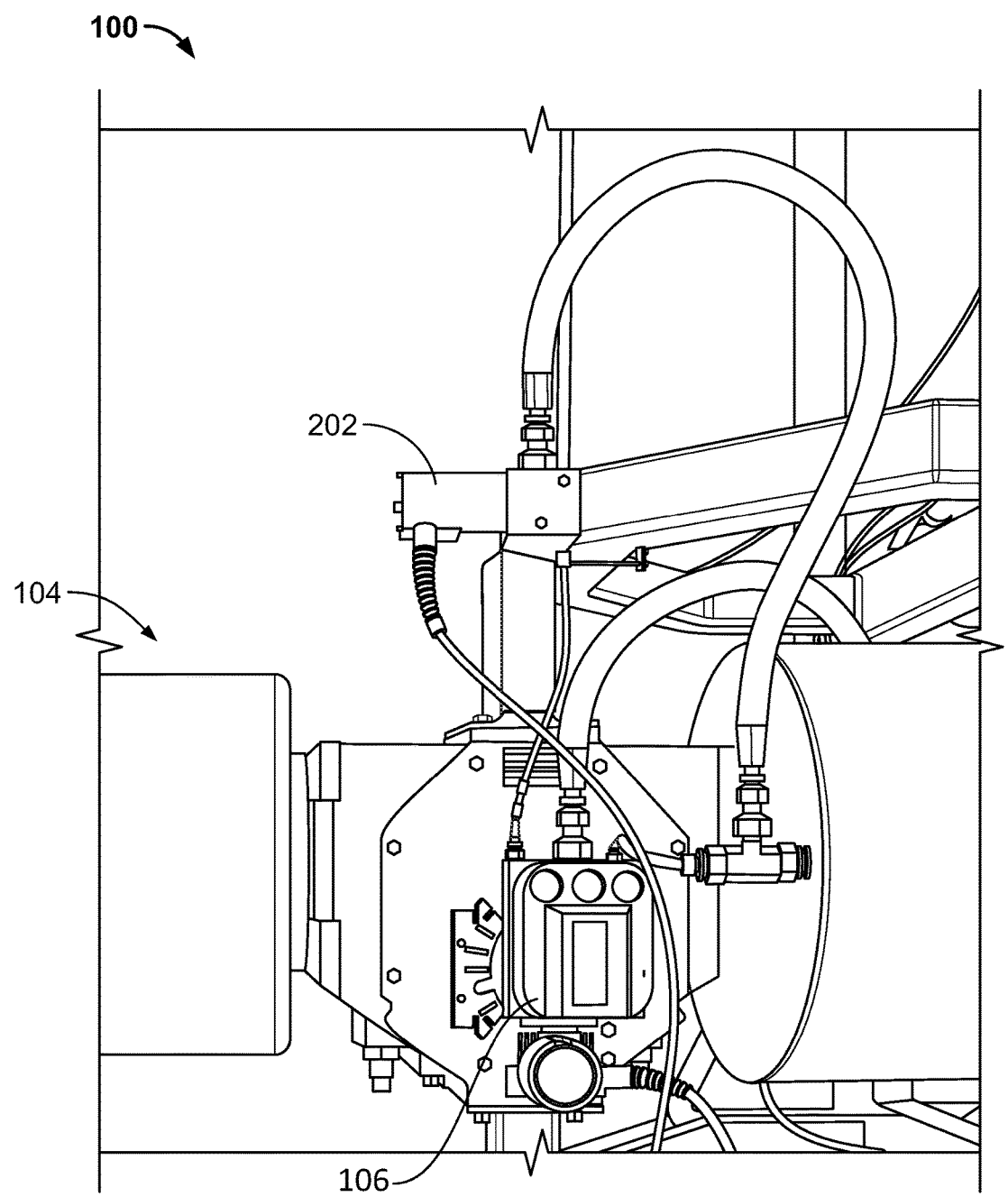
FIG. 2 illustrates the actuator and the valve positioner of FIG. 1 and an example solenoid valve in accordance with the teachings of this disclosure.

FIG. 2 illustrates the valve positioner 106, the solenoid valve 202, and a portion of the actuator 104 of the example emergency system 100. In operation, upon detection of a hazardous and/or dangerous environment, the solenoid valve 202 is de-energized (e.g., power is not supplied to the solenoid valve 202) to cause the solenoid valve 202 to actuate the actuator 104 which, in turn, actuates the shutdown valve 102 (FIG. 1) toward a trip position (e.g., the closed position for the shutdown valve 102). In addition to periodically testing the shutdown valve 102 and/or the actuator 104, the valve positioner 106 of the example emergency system 100 periodically tests the solenoid valve 202 to verify that the solenoid valve 202 will actuate the actuator 104 upon detection of a trip (e.g., hazardous and/or dangerous) condition. For example, the valve positioner 106 conducts a test to determine whether the solenoid valve 202 switches, upon the valve positioner 106 interrupting power provided to the solenoid valve 202, from a first state (e.g., an energized state, a normal state) to a second state (e.g., a de-energized state, an emergency state, a trip state) to actuate the actuator 104.

Figure 3:
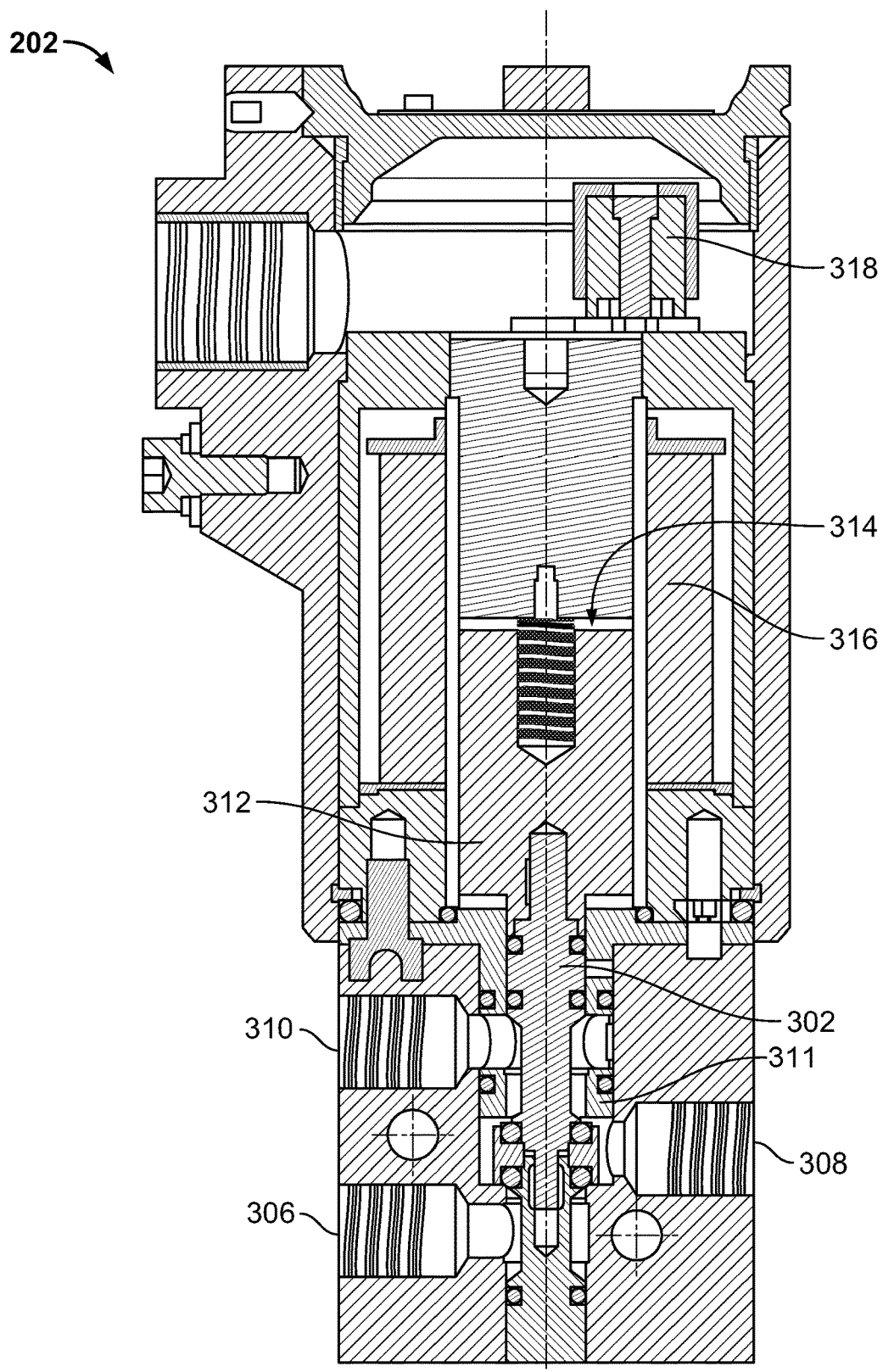
FIG. 3 is a cross-sectional view of the solenoid valve of FIG. 2.

FIG. 3 is a cross-sectional view of the example solenoid valve 202 of the emergency system 100 (FIGS. 1-2). As illustrated in FIG. 3, the solenoid valve 202 is a 3/2-way valve in which a stem 302 actuates to define two alternate fluid paths between three ports. For example, in a first state (e.g., an energized state, a normal state), the stem 302 of the solenoid valve 202 defines a first fluid path between a first valve port 306 and a second valve port 308. To define the first fluid path of the first state, the stem 302 blocks, seals and/or otherwise prevents fluid to flow through a third valve port 310. Further, as illustrated in FIG. 3, the stem 302 may be actuated to transition the solenoid valve 202 to a second state (e.g., a de-energized state, an emergency state, a trip state) in which the stem 302 defines a second fluid path 311 of the solenoid valve 202 between the second and third valve ports 308, 310 by blocking, sealing and/or otherwise preventing fluid to flow through the first valve port 306.

As illustrated in FIG. 3, the stem 302 is coupled to an armature 312 such that movement of the armature 312 along a pathway 314 causes the stem 302 to traverse between the first state and the second state of the solenoid valve 202. In the illustrated example, the armature 312 is at least partially disposed in the pathway 314 formed by a solenoid coil 316 that produces a magnetic field. The armature 312 is composed of magnetic material. As a result, the magnetic field produced by the solenoid coil 316 urges, moves and/or actuates the armature 312 as the solenoid coil 316 transitions between an energized state and a de-energized state to cause the stem 302 to transition between the first state and the second state of the solenoid valve 202. In the illustrated example, the solenoid coil 316 is de-energized and the armature 312 and the stem 302 are positioned in the second state of the solenoid valve 202. When the solenoid coil 316 is energized, the magnetic field produced by the solenoid coil 316 changes, thereby causing the magnetic armature 312 and the stem 302 coupled to the armature 312 to actuate along the pathway 314 to the first state of the solenoid valve 202. To de-energize the solenoid coil 316, the valve positioner 106 interrupts power provided to the solenoid valve 202 for a pulse duration via wiring that is coupled to the solenoid valve 202 via a terminal block 318. For example, the wiring is coupled to the terminal block 318 to communicatively couple the solenoid valve 202 to the valve positioner 106 (FIGS. 1 and 2) that tests the functionality of the solenoid valve 202 and/or to a controller (e.g., a programmable controller, a programmable logic controller, a logic solver, etc.) that detects hazardous and/or dangerous conditions via sensor(s).

Figure 4:
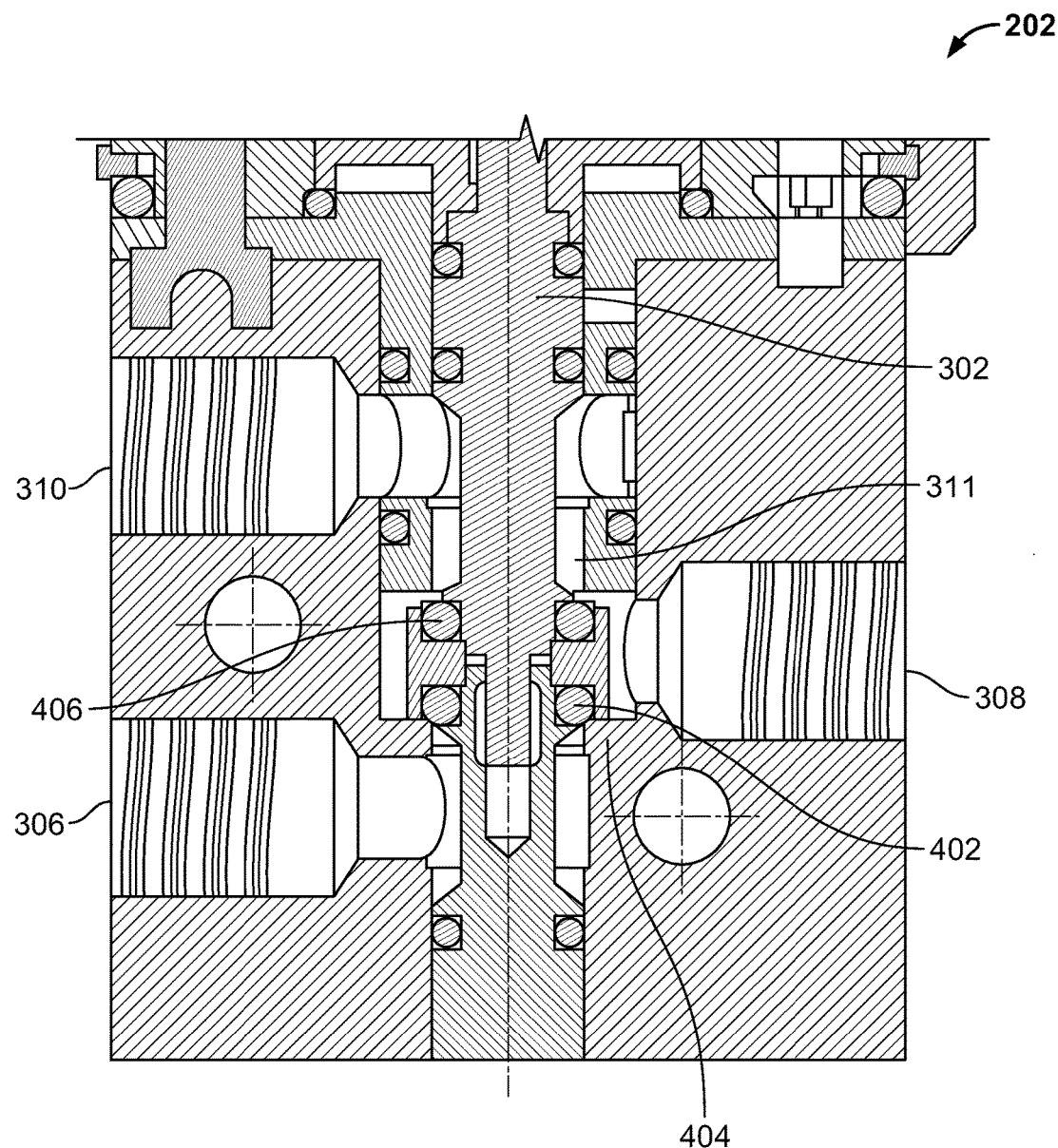
FIG. 4 is an enlarged cross-sectional view of valve ports of the solenoid valve of FIG. 2.

FIG. 4 is an enlarged cross-sectional view of the first, second, and third valve ports 306, 308, 310 and the stem 302 when the solenoid valve 202 is in the second state. In the illustrated example, the stem 302 includes a first seal 402 (e.g., a first o-ring) that engages a body 404 of the solenoid valve 202 adjacent the first valve port 306. The first seal 402 forms a seal with the body 404 of the solenoid valve 202 to prevent the first valve port 306 from being in fluid communication with the third valve port 310 and the second valve port 308 when the solenoid valve 202 is in the second state. Further, the stem 302 does not block the third valve port 310 or the second valve port 308 when the solenoid valve 202 is in the second state to define the second fluid path 311 of the second state.

As illustrated in FIG. 4, the stem 302 includes a second seal 406 (e.g., a second o-ring) that is to engage the body 404 of the solenoid valve 202 adjacent the third valve port 310 when the solenoid valve 202 is in the first state. The second seal 406 forms a seal with the body 404 of the solenoid valve 202 to prevent the third valve port 310 from being in fluid communication with the second valve port 308 or the first valve port 306 in the first state of the solenoid valve 202. Further, the stem 302 does not block the second valve port 308 or the first valve port 306 when the solenoid valve 202 is in the first state to define the first fluid path of the first state.

Figure 5:
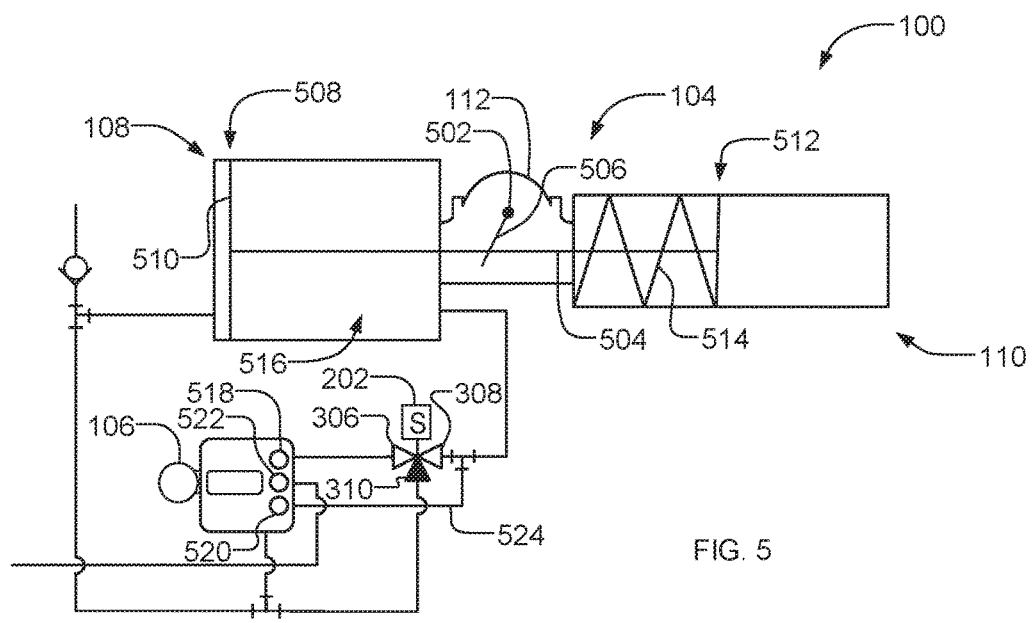
FIG. 5 is a fluid flow schematic of the actuator, the valve positioner, and the solenoid valve of FIGS. 1-2 in a first state in accordance with the teachings of this disclosure.
Figure 6:
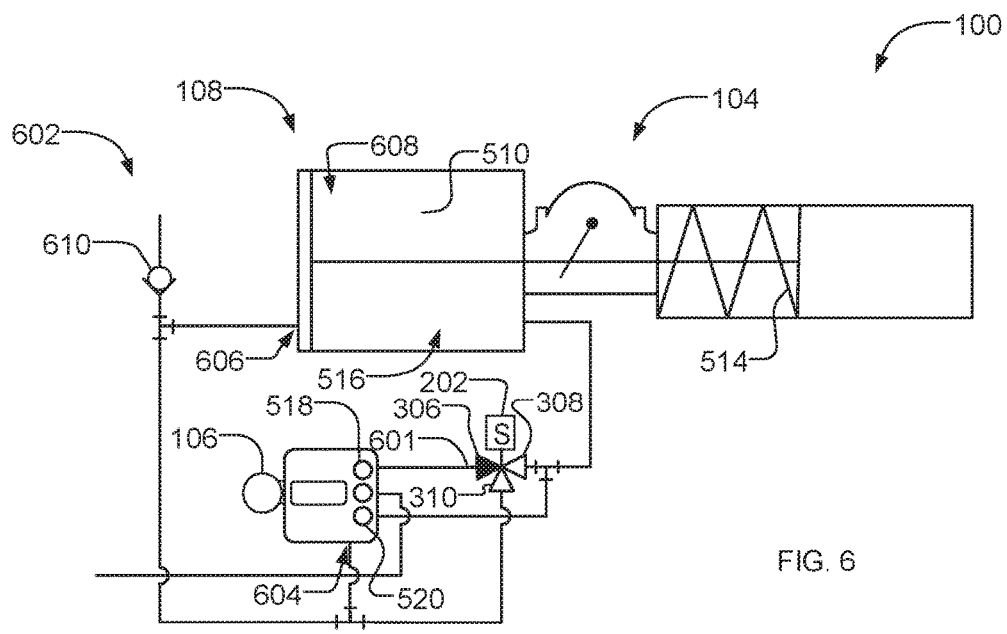
FIG. 6 is a fluid flow schematic of the actuator, the valve positioner, and the solenoid valve of FIGS. 1-2 in a second state in accordance with the teachings of this disclosure.

FIG. 5-6 depict a fluid flow schematic of the example emergency system 100 in which the valve positioner 106 tests the functionality of the solenoid valve 202 independently of testing the functionality of the shutdown valve 102 (FIG. 1) and/or the actuator 104. More specifically, FIG. 5 illustrates the emergency system 100 during testing of the solenoid valve 202 when the solenoid valve 202 is in the first state (e.g., the energized state, the normal state), and FIG. 6 illustrates the emergency system 100 during testing of the solenoid valve 202 when the solenoid valve 202 is in the second state (e.g., the de-energized state, the emergency state, the trip state).

As illustrated in FIG. 5, the actuator 104 includes a shaft 502 that is operatively coupled to the valve member of the shutdown valve 102 to actuate the shutdown valve 102 between the open and closed positions. The shaft 502 is operatively coupled to a stem 504 of the actuator 104 via a yoke mechanism 506 disposed in the drive module housing 112. A first end 508 of the stem 504 extends into the first chamber 108 of the actuator 104 and couples to a piston 510 disposed in the first chamber 108, and a second end 512 of the stem 504 extends into the second chamber 110 and couples to a spring 514 disposed in the second chamber 110.

In FIG. 5, the actuator 104 is in a rest position that corresponds to the open position of the shutdown valve 102. For example, the spring 514 is preloaded such that the spring 514 is compressed within the second chamber 110. Further, pressure within a pressure chamber 516 of the first chamber 108 exerts a force on the piston 510 in a first direction (e.g., to the left in the illustrated example) that is substantially greater than a force (e.g., a preload) exerted by the spring 514 onto the second end 512 of the stem 504 in an opposing direction (e.g., to the right in the illustrated example). The actuator 104 remains in the rest position until the force applied by the spring 514 overcomes the force applied by the pressure in the pressure chamber 516. For example, upon detection of a hazardous and/or dangerous condition, the pressure chamber 516 may be vented for a period of time to substantially reduce the pressure within the pressure chamber 516. In such instances, the actuator 104 begins to close the shutdown valve 102 only when the force applied to the piston 510 becomes less than the force applied by the spring 514.

Further, as illustrated in FIG. 5, the actuator 104, the valve positioner 106, and the solenoid valve 202 of the example emergency system 100 are fluidly coupled together. The valve positioner 106 includes a first pressure port 518, a second pressure port 520, and a third pressure port 522. The third pressure port 522 receives supply fluid (e.g., unregulated plant air) that is provided to the first pressure port 518, the first pressure port 518 is in fluid communication with the first valve port 306 of the solenoid valve 202, and the second pressure port 520 is in fluid communication with the second valve port 308 of the solenoid valve 202 and the pressure chamber 516 of the actuator 104 via a sense line 524. Further, the third valve port 310 is in fluid communication with a vent.

In FIG. 5, the solenoid valve 202 is in the first state in which the third valve port 310 is closed to form the first fluid path between the first valve port 306 and the second valve port 308. As a result, the pressure chamber 516 of the actuator 104 is in fluid communication with and receives fluid from the first pressure port 518 of the valve positioner 106. For example, the fluid provided by the first pressure port 518 causes the pressure chamber 516 to produce a first pressure in the pressure chamber 516 when the solenoid valve 202 is in the first state. The first pressure of the pressure chamber 516 applies a first force to the piston 510 that is greater than a preload of the actuator 104 (e.g., provided by the spring 514), thereby enabling the actuator 104 to remain in the rest position when the solenoid valve 202 is in the first state.

Further, when the solenoid valve 202 is in the first state, the valve positioner 106 is in a pressure control state during which the valve positioner 106 regulates an upstream pressure of the solenoid valve 202. For example, the third pressure port 522 of the valve positioner 106 receives supply fluid that may be unregulated and/or have a fluctuating pressure. To enable fluid having a substantially constant and/or steady pressure to be provided to the solenoid valve 202, the valve positioner 106 regulates the supply fluid received by the third pressure port 522 to enable the first pressure port 518 to produce and/or maintain a controlled, non-fluctuating pressure upstream of the solenoid valve 202. In some examples, the valve positioner 106 maintains the upstream pressure of the solenoid valve 202 at a predetermined initial value that is less than an average supply pressure received by the valve positioner 106 by a predetermined amount. In some examples, the valve positioner 106 causes the predetermined initial value of the upstream pressure of the solenoid valve 202 to be about 5 pounds per square inch less than the average of the fluctuating supply pressure. The valve positioner 106 provides the regulated upstream pressure to the solenoid valve 202 to produce consistent pressure characteristics (e.g., the initial value that is utilized to calculate pressure changes across the solenoid valve 202) when testing the functionality of the solenoid valve 202.

The valve positioner 106 of the illustrated example tests the functionality of the solenoid valve 202 by determining whether the solenoid valve 202 transitions between the first state (FIG. 5) and the second state (FIG. 6) when the valve positioner 106 instructs (e.g., by interrupting power provided to) the solenoid valve 202 to do so. For example, the valve positioner 106 may detect an error condition if the stem 302 (FIGS. 3 and 4) does not move and/or moves too slowly to transition the solenoid valve 202 from the first state to the second state upon interrupting the power provided to the solenoid valve 202. The valve positioner 106 detects whether the solenoid valve 202 transitions from the first state to the second state by determining whether and to what extent the power interruption causes a change in pressure across the solenoid valve 202. Because the force applied to the piston 510 is substantially greater than the force applied by the spring 514 when the solenoid valve 202 of the example emergency system 100 is in the first state, the valve positioner 106 is able to verify the functionality of the solenoid valve 202 by inducing and measuring a relatively small decrease and/or increase in pressure without affecting the position of the actuator 104 and/or the shutdown valve 102 (e.g., without closing the shutdown valve 102).

To detect a change in pressure of the pressure chamber 516 of the actuator 104, the second pressure port 520 of the valve positioner 106 measures a pressure of the pressure chamber 516 via the sense line 524. For example, the valve positioner 106 measures, via the sense line 524, an initial pressure (e.g., an initial pressure 808 of FIG. 8) associated with the first state before the solenoid valve 202 transitions to the second state. Further, the valve positioner 106 instructs the solenoid valve 202 to transition to the second state and monitors the pressure of the pressure chamber 516 of the actuator 104 as the solenoid valve 202 transitions between the first state and the second state.

FIG. 6 depicts the example emergency system 100 when the solenoid valve 202 is in the second state. As illustrated in FIG. 6, the first valve port 306 is closed in the second state, thereby forming the second fluid path 311 (FIGS. 3 and 4) between the second valve port 308 and the third valve port 310 of the solenoid valve 202. Thus, when the solenoid valve 202 is in the second state, the solenoid valve 202 enables fluid to be vented from the pressure chamber 516, through the second fluid path 311 of the solenoid valve 202, and to the vent. As a result, the pressure measured by the second pressure port 520 in the illustrated example decreases over time when the solenoid valve 202 is in the second state relative to when the solenoid valve 202 is in the first state.

When the solenoid 202 is in the first state, the first pressure port 518 of the valve positioner 106 is in fluid communication with the pressure chamber 516 of the actuator 104 via a control line 601. When the solenoid 202 is in the second state, the first pressure port 518 remains fluidly coupled to the control line 601 but not to the pressure chamber 516. Because the pressure chamber 516 contains a substantially large volume of fluid relative to the control line 601, a volume of fluid in communication with the first pressure port changes (e.g., decreases) substantially when the solenoid valve 202 transitions between states, thereby causing the pressure control of the valve positioner 106 to destabilize. As a result, the pressure measured by the valve positioner 106 may be unstable, oscillate and/or fluctuate over a short period of time. To stabilize and/or prevent destabilization of the pressure differential measured by the valve positioner 106, the valve positioner transitions from the pressure control state to a saturated state upon the solenoid valve 202 transitioning to the second state. In some examples, the valve positioner 106 is set to the pressure control state via end-point pressure control to prevent the valve positioner 106 from supplying full supply pressure to the solenoid valve 202. To transition the valve positioner 106 from the pressure control state to the saturated state, the valve positioner 106 bypasses a pressure controller of the valve positioner 106 and causes a servo of the valve positioner 106 to saturate by driving an I/P transducer of the valve positioner 106 to a maximum level. In the saturated state, the valve positioner 106 provides a full supply pressure in which the pressure of the fluid provided by the valve positioner 106 to the solenoid valve 202 is unregulated. In the illustrated example, the solenoid valve 202 is in critical flow when the solenoid valve 202 is in the second state and the valve positioner 106 is in the saturated state.

In some instances, there may be a delay between the valve positioner 106 instructing the solenoid valve 202 to transition to the second state and the solenoid valve 202 transitioning to the second state. For example, the delay may be a communicative and/or electrical delay between the valve positioner 106 and the solenoid valve 202 and/or a mechanical delay of the solenoid valve 202 (e.g., a delay in the stem 302 moving along the pathway 314 of FIG. 3). To prevent the valve positioner 106 from transitioning to the saturated state before the solenoid valve 202 transitions to the second state and, thus, affecting the initial pressure utilized to determine the functionality of the solenoid valve 202, the valve positioner 106 transitions to the saturated state upon detecting a pressure change (e.g., a decrease in pressure) across the solenoid valve 202 caused by the second state. For example, to test the functionality of the solenoid valve 202, the valve positioner 106 identifies a maximum pressure change (e.g., a maximum decrease in pressure during and/or after the pulse signal) relative to the initial pressure and compares the maximum pressure change to a minimum trip value. If the maximum pressure change is greater than the minimum trip value, the valve positioner 106 may determine that the solenoid valve is in a ready or functioning state. Thus, the valve positioner 106 transitions to the saturated state to stabilize the valve positioner 106 and, thus, enable the valve positioner 106 to determine the functionality of the solenoid valve 202.

The valve positioner 106 further tests the functionality of the solenoid valve 202 by instructing the solenoid valve 202 to return to the first state (e.g., by permitting power to be supplied to the solenoid valve 202) and comparing the pressure change at a monitoring end time to a maximum reset value. If the pressure change at the monitoring end time is less than the maximum reset value, the valve positioner 106 may determine that the solenoid valve is in a ready or functioning state. Additionally or alternatively, to increase a reset rate at which the solenoid valve 202 returns to the initial pressure, the valve positioner 106 remains in the saturated state until the solenoid valve 202 reaches the initial pressure. For example, the solenoid valve 202 is in subcritical flow when the solenoid valve 202 is in the first state and the valve positioner 106 is in the saturated state. Once the solenoid valve 202 returns to the initial pressure, the valve positioner 106 transitions from the saturated state to the pressure control state.

Further, in the illustrated example, the emergency system 100 incorporates a rebreather system 602 in which the third valve port 310 of the solenoid valve 202, a vent 604 of the valve positioner 106, and a vent 606 of a secondary chamber 608 of the first chamber 108 of the actuator 104 are vented through a check valve 610. The vent 606 of the first chamber 108 prevents a vacuum from forming in the secondary chamber 608 as the piston 510 moves within the first chamber 108 (e.g., in a rightward direction in the illustrated example) to further enable movement of the piston 510 when the pressure within the pressure chamber 516 changes. To prevent the secondary chamber 608 from drawing in polluted air and/or chemicals from the atmosphere, the rebreather system 602 enables the secondary chamber 608 to pull in substantially clean air from the vent 604 of the valve positioner 106 and/or the third valve port 310 of the solenoid valve 202. Further, the check valve 610 maintains a pressure (e.g., approximately 1 pound per square inch) within the rebreather system 602 to enable the secondary chamber 608 to draw the vented air from the vent 604 of the valve positioner 106 and/or the third valve port 310 of the solenoid valve 202. Thus, the valve positioner 106 is capable of testing the functionality of the solenoid valve 202 when the rebreather system 602 is incorporated into the emergency system 100. Additionally or alternatively, the valve positioner 106 is capable of testing the functionality of the solenoid valve 202 when no rebreather system is incorporated into the emergency system 100.

Figure 7:
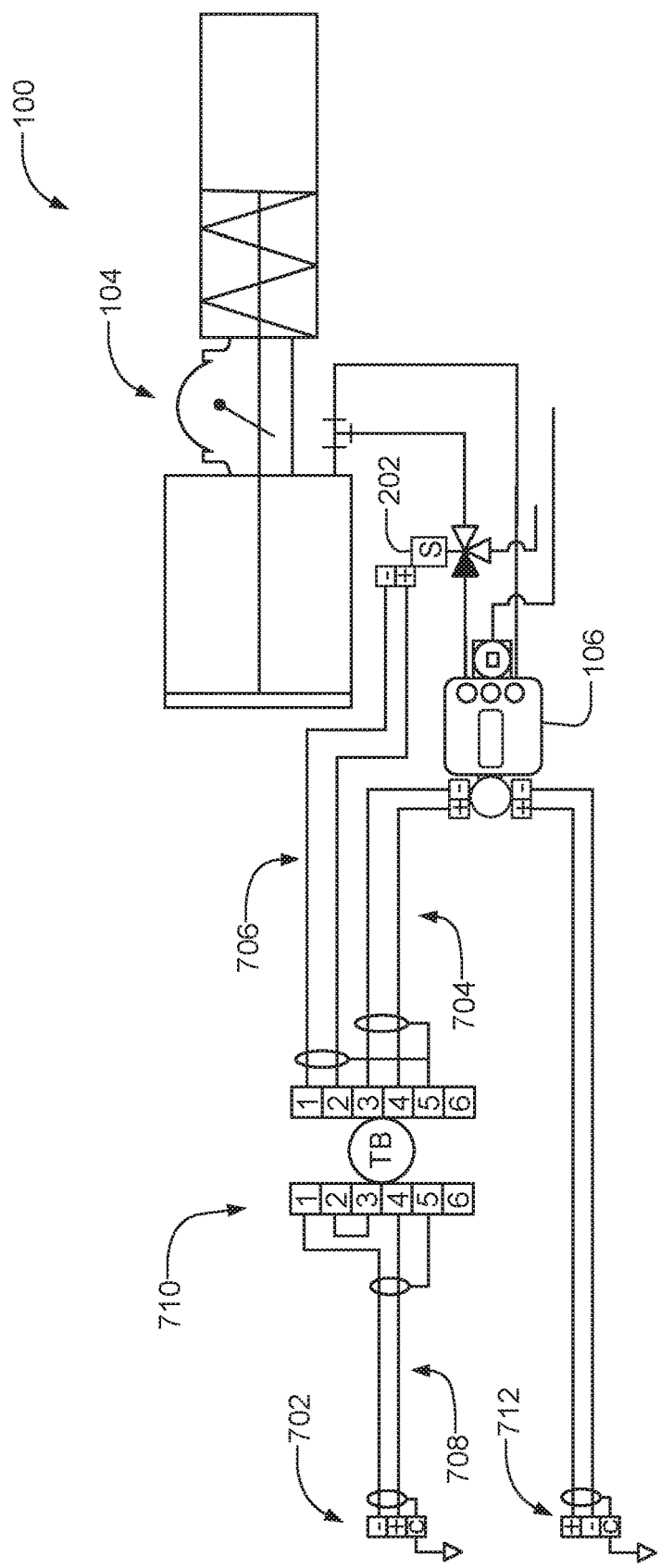
FIG. 7 is an electrical and fluid flow schematic of the actuator, the valve positioner, and the solenoid valve of FIGS. 1-2 in accordance with the teachings of this disclosure.

FIG. 7 depicts an electrical and fluid flow schematic of the emergency system 100 in accordance with the teachings herein when the solenoid valve 202 is in the second state. As illustrated in FIG. 7, the solenoid valve 202 is communicatively coupled to the valve positioner 106 and a first output source 702 via wiring 704, 706, 708. For example, to communicatively couple the solenoid valve 202 and the valve positioner 106, the wiring 704 couples the valve positioner 106 to a terminal block 710 and the wiring 706 couples the terminal block 710 to the solenoid valve 202. Thus, the wiring 704, 706 enables the valve positioner 106 to interrupt and/or permit power to be provided to the solenoid valve 202 to test the functionality of the solenoid valve 202. Further, the wiring 708 couples the first output source 702 to the terminal block 710 to communicatively couple the first output source 702 to the solenoid valve 202. In some examples, the first output source 702 is an output terminal of a controller (e.g., a programmable controller, a programmable logic controller, a logic solver, etc.) that supplies and/or provides power (e.g., via a 24+VDC signal) to the solenoid valve 202 to open the shutdown valve 102 (FIG. 1) and/or terminates power (e.g., via a 0 VDC signal) to close the shutdown valve 102 upon detection of a hazardous and/or dangerous condition. Thus, as illustrated in FIG. 7, the valve positioner 106 is installed to test the solenoid valve 202 without affecting an ability of the solenoid valve 202 to close the shutdown valve 102 upon detection of a hazardous and/or dangerous condition.

As illustrated in FIG. 7, the valve positioner 106 is communicatively coupled to a second output source 712 that sends an input signal (e.g., a 4-20 mA signal) to the valve positioner 106 to control the valve positioner 106. Further, the output source 712 sends a test signal (e.g., via HART communication protocol, PROFIBUS PA, FOUNDATION Fieldbus, etc.) to start a test (e.g., a partial stroke test) of the solenoid valve 202, the actuator 104 and/or the shutdown valve 102. Thus, the valve positioner 106 of the illustrated example tests the functionality of the solenoid valve 202 independently of testing the functionality of the shutdown valve 102 and/or the actuator 104. In some instances, the solenoid valve 202 may be more likely to deteriorate and/or become damaged over time relative the actuator 104 and/or the shutdown valve 102. In such instances, the valve positioner 106 conducts a test of the solenoid valve 202 more frequently (e.g., monthly) than it may conduct a partial stroke test of the shutdown valve 102 (e.g., quarterly, yearly, etc.). Further, in some examples, the valve positioner 106 is scheduled (e.g., programmed) to conduct a partial stroke test of the shutdown valve 102 upon testing the functionality of the solenoid valve 202. In such examples, if the valve positioner 106 identifies an error with and/or a malfunction of the solenoid valve 202, the valve positioner 106 may be programmed to and/or enable an operator to elect to abort or continue with the scheduled partial stroke test.

Figure 8:
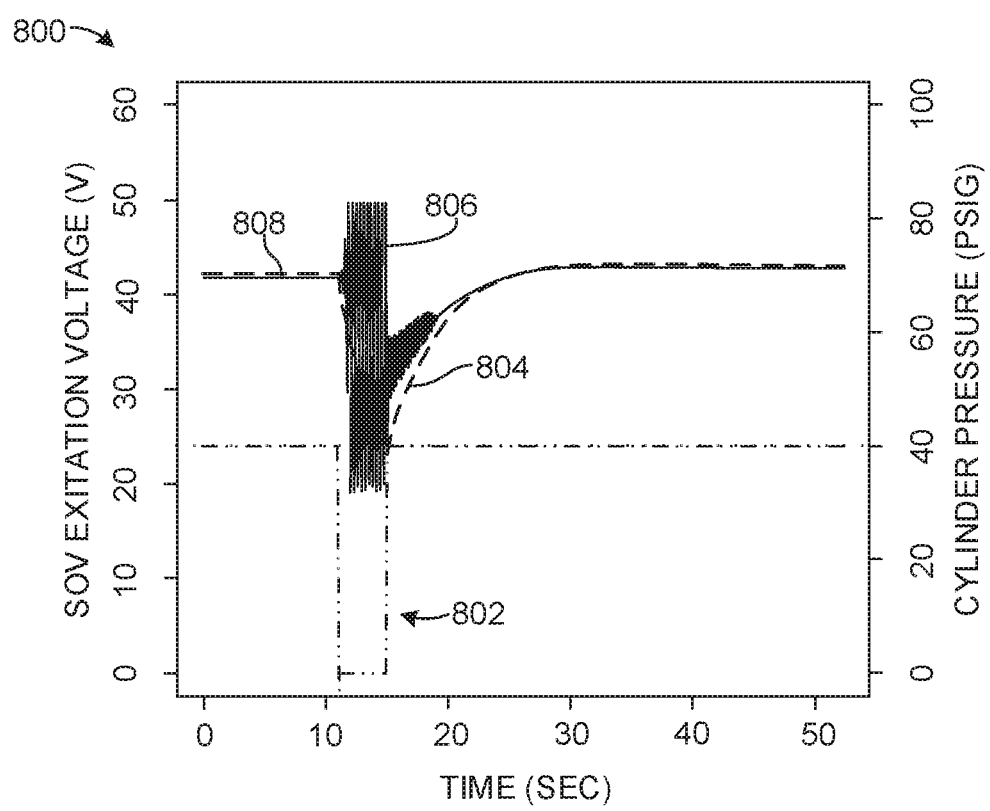
FIG. 8 depicts pressure change measurements of the solenoid valve of FIGS. 2-7 when a valve positioner is not stabilized during testing of the solenoid valve of FIGS. 2-7.

FIG. 8 is a graph 800 depicting measurements of a pressure change of the pressure chamber 516 (FIGS. 5-6) of the actuator 104 (FIGS. 1-2 and 5-7) when the valve positioner 106 (FIGS. 1-2 and 5-7) remains in the pressure control state as the solenoid valve 202 (FIGS. 2-7) transitions to the second state. As illustrated in FIG. 8, a power interruption 802 to the solenoid valve 202 causes a pressure change 804 in the pressure chamber 516. For example, the pressure in the pressure chamber 516 decreases during the power interruption 802 and increases upon power returning to the solenoid valve 202. Further, because the volume under control by the valve positioner 106 changes (e.g., decreases) substantially upon the solenoid valve 202 transitioning to the second state (e.g., the valve positioner is no longer controlling the volume of the actuator), the pressure control of the valve positioner 106 destabilizes when the valve positioner 106 remains in the pressure control state when the solenoid valve 202 transitions to the second state. For example, the measured pressure change 806 of the valve positioner 106 oscillates and/or fluctuates from the initial pressure 808 at a substantially high frequency during the power interruption 802, thereby causing the determination of the functionality of the solenoid valve 202 by the valve positioner 106 to be difficult and/or inaccurate. In some examples, the valve positioner 106 may remain in the pressure control state and identify that the solenoid valve 202 has transitioned to the second state by detecting the corresponding oscillation and/or fluctuation of the measured pressure change 806.

Figure 9:
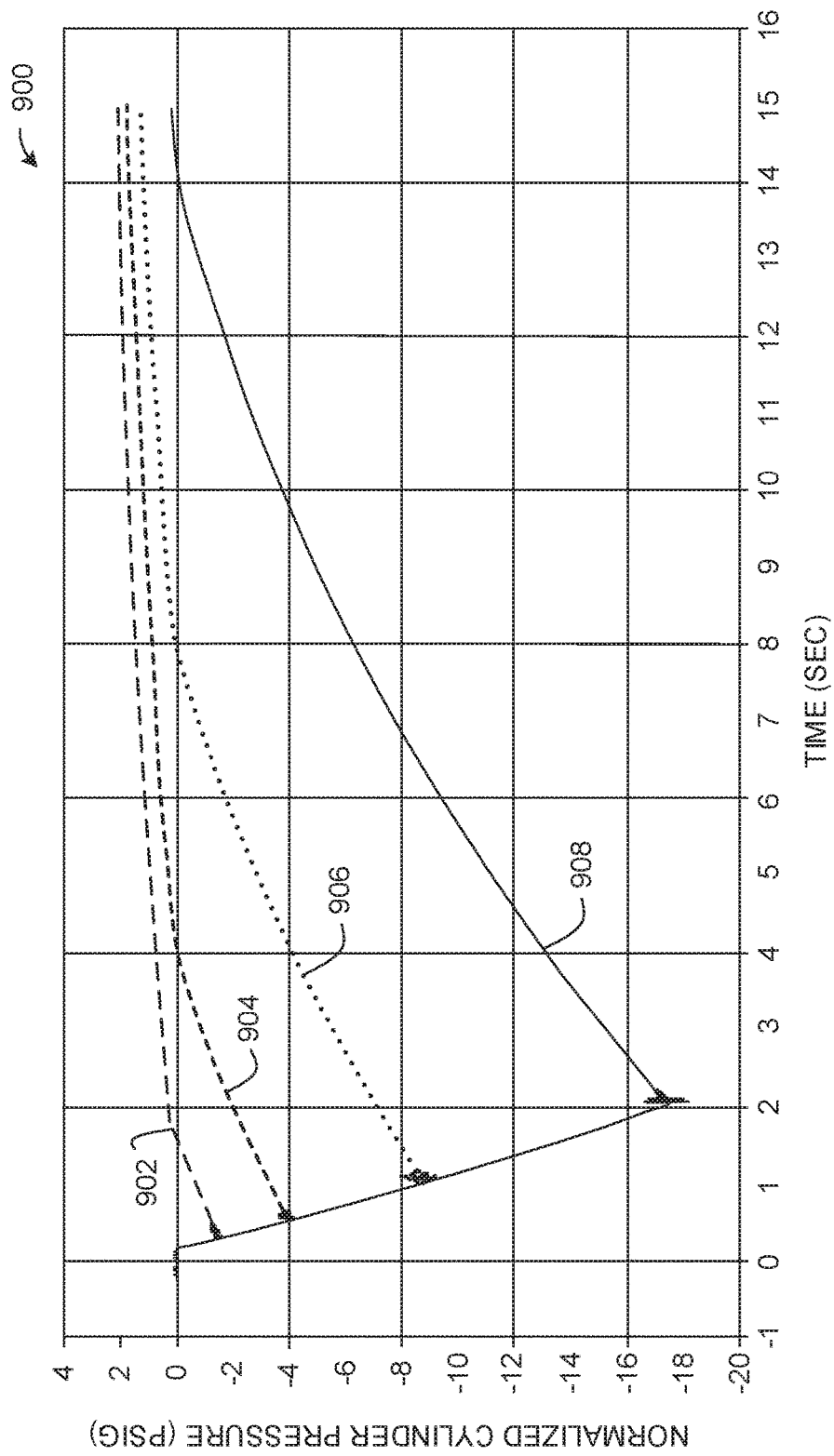
FIG. 9 depicts pressure change measurements of the solenoid valve of FIGS. 2-7 when stabilizing the valve positioner of FIGS. 1-2 and 5-7 in accordance with the teachings of this disclosure.

FIG. 9 is a graph 900 depicting example pressure change measurements taken by the valve positioner 106 (FIGS. 1-2 and 5-7) to test the functionality of the solenoid valve 202 (FIGS. 2-7) when the valve positioner 106 is stabilized via the saturated state. For example, the graph 900 depicts the pressure change of the pressure chamber 516 (FIGS. 5-6) of the actuator 104 when the supply fluid provided to the valve positioner 106 has a pressure of about 80.7 pounds per square inch gauge and the upstream pressure of the solenoid valve 202 (e.g., the pressure between the first pressure port 518 of the valve positioner 106 and the first valve port 306 of the solenoid valve 202) is about 75 pounds per square inch gauge. Further, the initial pressure in the pressure chamber 516 is normalized to a value of '0.' In the illustrated example, the graph 900 includes a first line 902 that represents the pressure change across the solenoid valve 202 over time when power is interrupted for a pulse duration about 0.25 seconds, a second line 904 that represents the pressure change when power is interrupted for a pulse duration about 0.5 seconds, a third line 906 that represents the pressure change when power is interrupted for a pulse duration about 1.0 seconds, and a fourth line 908 that represents the pressure change when power is interrupted for a pulse duration about 2.0 seconds. As illustrated in FIG. 9, the measured pressure change 806 of the valve positioner 106 (e.g., represented by the first line 902, the second line 904, the third line 906 and/or the fourth line 908) does not oscillate and/or fluctuate when the valve positioner 106 is in the saturated state.

As illustrated in FIG. 9, by transitioning the valve positioner 106 to the saturated state upon the solenoid valve 202 transitioning to the second state, the valve positioner 106 enables the pressure to decrease at a consistent rate (e.g., a substantially linear rate) irrespective of the pulse duration due to choke flow conditions in which the flow rate is unaffected by downstream pressure. For example, the pressure decreases at a consistent, substantially linear rate for pulse durations of 0.25 seconds, 0.5 seconds, 1 second and/or 2 seconds. Further, the valve positioner 106 is maintained in the saturated state after power is returned to the solenoid valve 202 to enable the pressure across the solenoid valve 202 to subsequently increase at a consistent reset rate (e.g., a first reset rate) that is greater than a reset rate (e.g., a second reset rate) associated with the pressure control rate. In other words, maintaining the valve positioner 106 after power is returned to the solenoid valve 202 and/or upon reaching a maximum pressure change (e.g., represented by respective minima in the lines 902, 904, 906, 908) of the pressure chamber 516 of the actuator 104 increases the reset rate at which the pressure in the pressure chamber 516 returns to the initial pressure 808 (FIG. 8).

Figure 10:
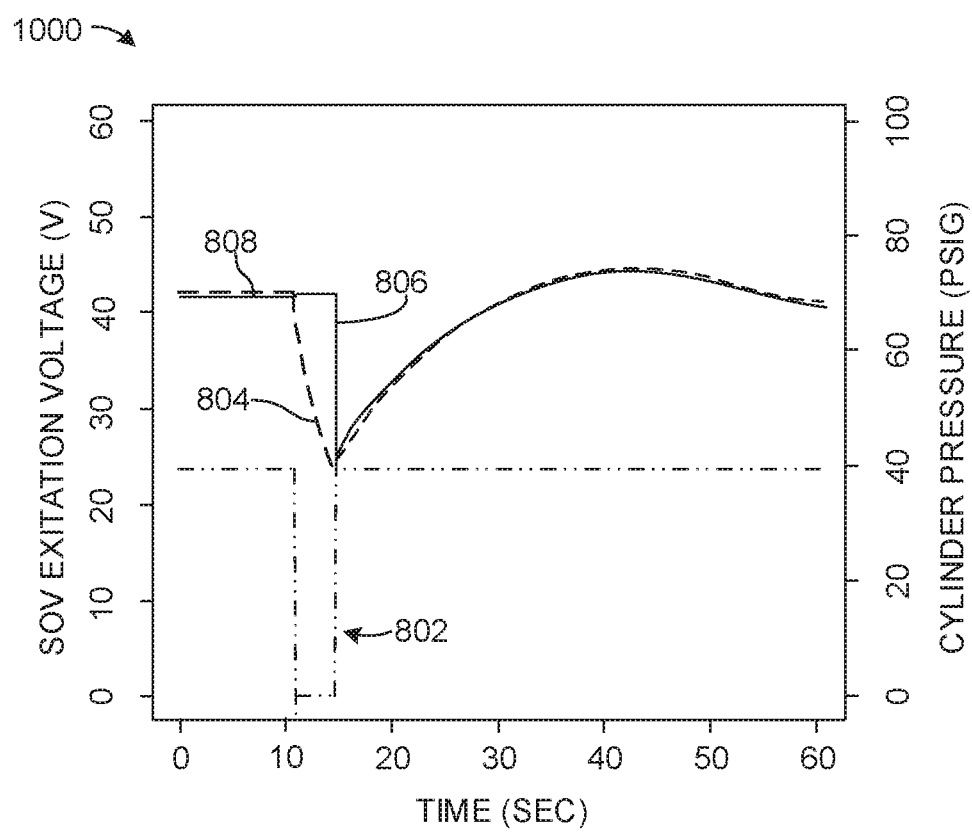
FIG. 10 depicts other pressure change measurements of the solenoid valve of FIGS. 2-7 when stabilizing the valve positioner of FIGS. 1-2 and 5-7 in accordance with the teachings of this disclosure.

Once the pressure across the solenoid valve 202 reaches the initial pressure 808 (normalized to a value of '0' in FIG. 10), the valve positioner 106 returns to the pressure control state. As illustrated in FIG. 10, the rate of the pressure change decreases once the initial pressure 808 is reached. Further, the pressure across the solenoid valve 202 eventually resettles at the initial pressure 808 if the solenoid valve 202 rests in the first state for a period of time. Thus, transitioning between the pressure control state and the saturated state of the valve positioner 106 enables the valve positioner 106 to stabilize and, thus, determine the functionality of the solenoid valve 202.

FIG. 10 is a graph 900 depicting other measurements of a pressure change of the solenoid valve 202 (FIGS. 2-7) when the solenoid valve transitions between the first state and the second state. In the illustrated example, the valve positioner 106 (FIGS. 1-2 and 5-7) transitions to a saturated state upon the solenoid valve 202 transitioning to the second state and returns the pressure control state upon detecting an increase in pressure in the pressure chamber 516 (FIGS. 5-6) of the actuator 104 (FIGS. 1-2 and 5-7). As illustrate in FIG. 10, the measured pressure change 806 of the valve positioner 106 does not oscillate and/or fluctuate during the power interruption 802. The measured pressure change 806 of the valve positioner 106 is substantially equal to and/or tracks the pressure change as the pressure in the pressure chamber 516 returns to the initial pressure 808, thereby enabling the valve positioner 106 to accurately determine the functionality of the solenoid valve 202.

Figure 11:
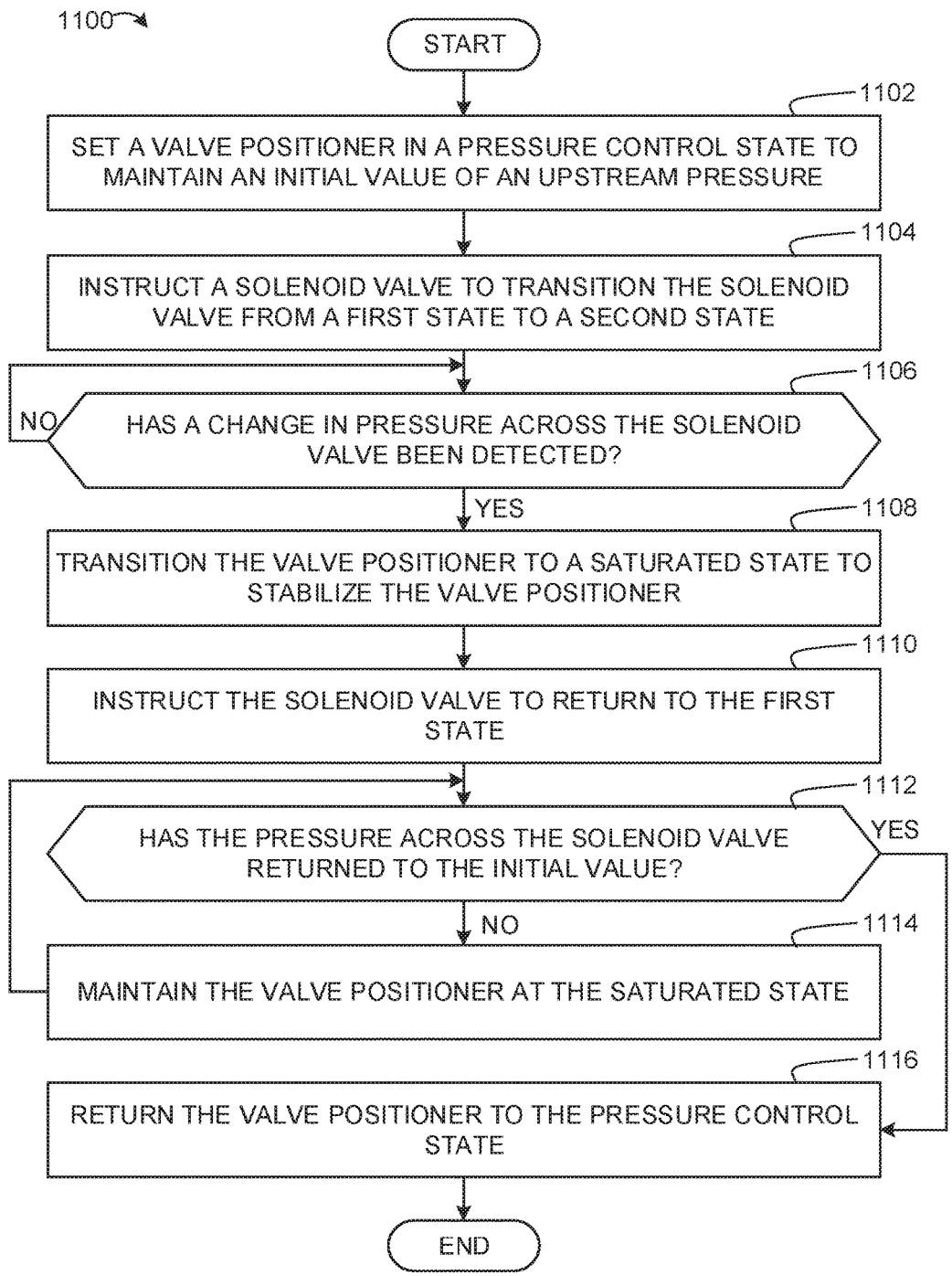
FIG. 11 is a flowchart representative of an example method to stabilize the valve positioner FIGS. 1-2 and 5-7 when testing the solenoid valve of FIGS. 2-7 in accordance with the teachings of this disclosure.

FIG. 11 is a flowchart representative of an example method 1100 to stabilize an example valve positioner when testing an example solenoid valve in accordance with the teachings herein. Although the example method 1100 is described with reference to the flowchart illustrated in FIG. 11, many other methods of stabilizing the valve positioner when testing the solenoid valve may alternatively be used.

For example, the order of execution of the blocks may be changed, and/or some of the blocks described changed, eliminated, and/or combined. Further, the blocks of the example method 1100 are implemented by executing corresponding instructions (e.g., first instructions, second instructions, third instructions, etc.) via a processor.

The example method 1100 for stabilizing a valve positioner when testing a solenoid valve is discussed in connection with the example emergency system 100 of FIGS. 1-2 and 5-7 and/or the example graph of FIG. 9. Further, because the example method 1100 may refer to the example emergency system 100 of FIGS. 1-2 and 5-7 and/or the example graph of FIG. 9, components identified in FIGS. 1-2, 5-7, and 9 having functions substantially similar or identical to the functions of components described below will not be described in detail again. Instead, the same reference numbers will be used for like structures.

The example method 1100 disclosed herein starts at block 1102 by setting a valve positioner (e.g., the valve positioner 106 of FIGS. 1-2 and 5-7) in a pressure control state to maintain an initial value of an upstream pressure (e.g., the initial pressure 808 of FIGS. 8 and 10). For example, the initial value is set at about 5 pounds per square inch less than an average of a fluctuating supply pressure. At block 1104, the valve positioner instructs a solenoid valve (e.g., the solenoid valve 202 of FIGS. 2-7) to transition the solenoid valve from a first state to a second state. For example, the valve positioner instructs the solenoid valve to transition to the second state by interrupting power provided to the solenoid valve (e.g., the power interruption 802 of FIGS. 8 and 10).

Further, the example method 1100 includes determining whether a change in pressure (e.g., a pressure drop or decrease) has been detected across the solenoid valve by the valve positioner (block 1106). If the valve positioner does not detect the change in pressure, the valve positioner may wait until the change in pressure is detected. For example, the solenoid valve may not immediately transition to the second state that causes the change in pressure upon the power being interrupted as a result of a communicative, electrical and/or mechanical delay with the solenoid valve. Upon detecting the change in pressure, the valve positioner transitions to a saturated state to stabilize the valve positioner (block 1108). For example, the valve positioner may otherwise destabilize if the valve positioner remains in the pressure control state upon the solenoid valve transitioning to the second state. At block 1110, the valve positioner instructs the solenoid valve to return to the first state. For example, the valve positioner returns the solenoid valve to the first state by permitting power to be provided to the solenoid valve (e.g., by terminating the power interruption 802).

Upon returning the solenoid valve to the first state, the pressure across the solenoid valve may begin to increase. For example, the valve positioner initially stays in the saturated state upon termination of the power interruption to increase a reset rate at which the pressure across the solenoid valve increases. At block 1112, the valve positioner determines whether the pressure across the solenoid valve has returned to the initial value. If the pressure across the solenoid valve has yet to return to the initial value, the saturated state of the valve positioner is maintained until the initial value is reached (block 1114). Upon the initial value being reached, the valve positioner returns to the pressure control state (block 1116). For example, the valve positioner returns to the pressure control state to reduce overshoot of the initial value. In some examples, the valve positioner may implement a bumpless transfer technique (e.g., by re-initializing the internal states of the valve positioner) to provide an improved transition when returning from the saturated state to the pressure control state.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
a solenoid valve that is to enable an actuator to close an emergency valve; and
a valve positioner fluidly and communicatively coupled to the solenoid valve, the valve positioner to:
be set in a pressure control state to maintain upstream pressure of the solenoid valve at a predetermined initial value prior to conducting a test of the solenoid valve;
detect a pressure change across the solenoid valve caused by the solenoid valve transitioning from a first state to a second state;
transition the valve positioner from the pressure control state to a saturated state upon detecting the pressure change during which the valve positioner provides a full supply pressure, the full supply pressure to stabilize the valve positioner upon the solenoid valve transitioning from the first state to the second state to conduct the test of the solenoid valve; and
maintain the saturated state until the pressure across the solenoid valve returns to the predetermined initial value.

2. The apparatus of claim 1, wherein the valve positioner returns to the pressure control state upon the valve positioner determining that the pressure across the solenoid valve has reached the predetermined initial value.

3. The apparatus of claim 1, wherein the valve positioner is set to the pressure control state via end-point pressure control to suspend the full supply pressure of the valve positioner to control the upstream pressure of the solenoid valve.

4. The apparatus of claim 1, wherein the valve positioner includes a pressure controller that is bypassed to transition the valve positioner from the pressure control state to the saturated state, the pressure controller is to affect the upstream pressure of the valve positioner.

5. The apparatus of claim 1, wherein the valve positioner receives a fluctuating supply pressure and maintains the upstream pressure of the solenoid valve to be less than an average supply pressure by a predetermined amount.

6. The apparatus of claim 1, wherein the valve positioner is to utilize the predetermined initial value to determine functionality of the solenoid valve.

7. The apparatus of claim 1, wherein the valve positioner maintains the predetermined initial value of the upstream pressure to produce consistent pressure characteristics during the test of the solenoid valve.

8. The apparatus of claim 1, wherein the valve positioner is maintained in the saturated state during critical flow and subcritical flow of the solenoid valve.

9. A method comprising:
setting, by executing first instructions via a processor, a valve positioner in a pressure control state to maintain upstream pressure of a solenoid valve of an emergency system at a predetermined initial value prior to conducting a test of the solenoid valve;
detecting, by executing second instructions via the processor, a pressure change across the solenoid valve caused by the solenoid valve transitioning from a first state to a second state;
upon detecting the pressure change, transitioning, by executing third instructions via the processor, the valve positioner from the pressure control state to a saturated state during which the valve positioner provides a full supply pressure to stabilize the valve positioner upon the solenoid valve transitioning from the first state to the second state to conduct the test of the solenoid valve; and
maintaining, by executing fourth instructions via the processor, the valve positioner in the saturated state until the pressure across the solenoid valve returns to the predetermined initial value.

10. The method of claim 9, further including returning the valve positioner to the pressure control state upon determining that the pressure across the solenoid valve reached the predetermined initial value.

11. The method of claim 10, wherein returning the valve positioner to the pressure control state reduces overshoot of the predetermined initial value.

12. The method of claim 9, further including utilizing the predetermined initial value to determine functionality of the solenoid valve.

13. The method of claim 9, wherein the predetermined initial value of the upstream pressure is maintained to produce consistent pressure characteristics during the test of the solenoid valve.

14. The method of claim 9, wherein transitioning the valve positioner to the saturated state upon detecting the pressure change prevents at least one of a communicative, electrical or mechanical delay in transitioning the solenoid valve between the first and second states from affecting the test of the solenoid valve.

15. The method of claim 9, wherein transitioning the valve positioner from the pressure control state to the saturated state includes bypassing a pressure controller of the valve positioner to prevent the pressure controller from affecting the upstream pressure of the valve positioner.

16. The method of claim 9, wherein maintaining the valve positioner in the saturated state after the solenoid valve returns to the first state increases a reset rate at which the pressure across the solenoid valve returns to the predetermined initial value.

17. The method of claim 9, further including receiving a supply pressure that fluctuates over time via the valve positioner.

18. The method of claim 17, wherein maintaining the upstream pressure of the solenoid valve includes the valve positioner maintaining the upstream pressure to be less than an average supply pressure received by the valve positioner.

19. An apparatus comprising:
means for actuating an actuator to close an emergency valve; and
means for positioning fluidly and communicatively coupled to the means for actuating, the means for positioning to be set in a pressure control state to maintain upstream pressure of the means for actuating at a predetermined initial value prior to conducting a test of the means for actuating, the means for positioning including:
means for detecting a pressure change across the means for actuating caused by the means for actuating transitioning from a first state to a second state; and means for transitioning the means for positioning from the pressure control state to a saturated state upon detecting the pressure change during which the means for positioning provides a full supply pressure, the full supply pressure to stabilize the means for positioning upon the means for actuating transitioning from the first state to the second state to conduct the test of the means for actuating, the means for transitioning to maintain the saturated state until the pressure across the means for actuating returns to the predetermined initial value.

20. The apparatus of claim 19, wherein the means for transitioning returns the means for positioning to the pressure control state upon the means for detecting the pressure change determining that the pressure across the means for actuating reached the predetermined initial value.

* * * * *